(12) United States Patent
Ikeda et al.

(10) Patent No.: US 12,287,648 B2
(45) Date of Patent: Apr. 29, 2025

(54) REMOTE CONTROL DEVICE

(71) Applicant: TOYOTA JIDOSHA KABUSHIKI KAISHA, Toyota (JP)

(72) Inventors: Keigo Ikeda, Nisshin (JP); Yasuhiro Saito, Toyoake (JP); Kazuo Yaegashi, Tokyo (JP); Hiroki Izu, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/677,273

(22) Filed: May 29, 2024

(65) Prior Publication Data
US 2024/0402718 A1 Dec. 5, 2024

(30) Foreign Application Priority Data
May 31, 2023 (JP) ................. 2023-089458

(51) Int. Cl.
G05D 1/225 (2024.01)
B62D 65/18 (2006.01)

(52) U.S. Cl.
CPC ............. G05D 1/225 (2024.01); B62D 65/18 (2013.01)

(58) Field of Classification Search
CPC ................................ G05D 1/225; B62D 65/18
See application file for complete search history.

(56) References Cited

U.S. PATENT DOCUMENTS

| | | |
|---|---|---|
| 2018/0122097 A1 | 5/2018 | Osamura et al. |
| 2018/0339703 A1 | 11/2018 | Nix |
| 2021/0347378 A1* | 11/2021 | Nabatchian ............ G06V 20/56 |
| 2022/0113418 A1* | 4/2022 | Wang ..................... G01S 7/4808 |
| 2022/0169381 A1* | 6/2022 | Alrasheed ............. B64C 39/024 |
| 2022/0214444 A1* | 7/2022 | Das ......................... G01S 17/50 |
| 2024/0111307 A1 | 4/2024 | Kumagai |

FOREIGN PATENT DOCUMENTS

| | | |
|---|---|---|
| CN | 112084937 B | 3/2021 |
| CN | 114612665 B | 10/2022 |
| JP | 11-259658 A | 9/1999 |
| JP | 2011-179909 A | 9/2011 |
| JP | 2018-072198 A | 5/2018 |
| JP | 2018-116014 A | 7/2018 |
| JP | 2023-053667 A | 4/2023 |
| WO | 2022/176072 A1 | 8/2022 |

OTHER PUBLICATIONS

Japanese Office Action for 2023-089458, dated Jul. 28, 2023.
Japanese Decision to Grant a Patent for 2023-089458, dated Dec. 8, 2023.

* cited by examiner

*Primary Examiner* — Hussein Elchanti
(74) *Attorney, Agent, or Firm* — Sughrue Mion, PLLC (57) ABSTRACT

A remote control device includes, at least one processor configured to perform processes including, acquiring three-dimensional point cloud data measured using a distance measuring device, estimating at least one of a position and an orientation of a moving object in the three-dimensional point cloud data by matching a template point cloud indicating the moving object with the three-dimensional point cloud data, determining a start position to start matching of the template point cloud with the three-dimensional point cloud data; and generating a control command for remotely controlling the moving object using at least one of the estimated position and the estimated orientation of the moving object and transmit the control command to the moving object.

6 Claims, 8 Drawing Sheets

REMOTE CONTROL DEVICE

CROSS-REFERENCE TO RELATED APPLICATION

This application claims priority to Japanese Patent Application No. 2023-089458 filed on May 31, 2023, incorporated herein by reference in its entirety.

BACKGROUND

1. Technical Field

The present disclosure relates to a remote control device.

2. Description of Related Art

There is known a technology for detecting the position of an object in a space. For example, Japanese Unexamined Patent Application Publication No. 11-259658 (JP 11-259658 A) discloses a technology in which two-dimensional projected images showing the side shapes of vehicles are generated from an input image acquired from a camera, the generated projected images are sequentially scanned after a two-dimensional model stored in a memory is positioned at the leading point of the two-dimensional projected images, and the position of a vehicle is recognized by executing matching for each scanning position.

SUMMARY

In the related art, the scanning is sequentially executed after the two-dimensional model stored in the memory is positioned at the leading point of the two-dimensional projected images. Therefore, there is a problem that a long period of time is required to complete the matching. Therefore, in the technology for detecting the position of a moving object by matching a model stored in a memory, there is a demand for a technology for shortening the period of time required to detect the position of the moving object.

The present disclosure can be realized in the following aspects.

A remote control device includes, at least one processer configured to perform processes including, acquiring three-dimensional point cloud data measured using a distance measuring device, estimating at least one of a position and an orientation of a moving object in the three-dimensional point cloud data by matching a template point cloud indicating the moving object with the three-dimensional point cloud data, determining a start position to start matching of the template point cloud with the three-dimensional point cloud data, and generating a control command for remotely controlling the moving object using at least one of the estimated position and the estimated orientation of the moving object and transmit the control command to the moving object.

The remote control device of this aspect can quickly detect the position of the moving object by determining the start position of matching near the moving object. Therefore, the processing period required to detect the position of the moving object by template matching can be shortened.

In the remote control device of the above aspect, the processes may further include determining the start position using an information on the position of the moving object in the three-dimensional point cloud data.

The remote control device of this aspect can quickly detect the position of the moving object by determining the start position of template matching using the information on the position of the moving object. Therefore, the processing period required for template matching can be shortened.

In the remote control device of the above aspect, the processes may further include, acquiring as the information on the position of the moving object, a previous matching position where previous matching between the three-dimensional point cloud data and the template point cloud has been completed, and determining the start position using the acquired previous matching position.

With the remote control device of this aspect, the processing period required for template matching can be shortened through simple processing using the previous matching position that is highly likely to be near the position of the moving object at the time of current matching.

In the remote control device of the above aspect, the processes may further include, estimating a position of the moving object after movement from the previous matching position during a period from a time of completion of the previous matching to a time before execution of current matching; and determining the start position using the estimated position after the movement.

The remote control device of this aspect can set the start position of matching closer to the position of the moving object at the time of current matching by estimating the position of the moving object after the movement. Therefore, the processing period required for template matching can further be shortened.

The remote control device of the above aspect, may further include a storage device configured to store a target route of the moving object that is the information on the position of the moving object, and the processes may further include determine any position on the target route as the start position.

The remote control device of this aspect can quickly detect the position of the moving object by setting the start position on the target route where the moving object is highly likely to be present. Therefore, the processing period required for template matching can be shortened.

In the remote control device of the above aspect, the processes may further include, acquiring a previous matching position where previous matching between the three-dimensional point cloud data and the template point cloud has been completed on the target route, and determining the start position using the acquired previous matching position on the target route.

The remote control device of this aspect can more quickly detect the position of the moving object using the previous matching position on the target route where the moving object is more highly likely to be present.

In the remote control device of the above aspect, the processes may further include determining the start position using, as the information on the position of the moving object, a position of the moving object detected from the three-dimensional point cloud data by a predetermined object detection method, or a position of the moving object detected based on a difference between point cloud data associated with a background of the three-dimensional point cloud data and point cloud data associated with the moving object.

The remote control device of this aspect can extract the provisional position of the moving object using the object detection, and quickly detect the position of the moving object by the simple method. Therefore, the processing period required for template matching can be shortened.

In the remote control device of the above aspect, the processes may further include determining the start position using the position of the moving object associated with a moving object identification information, for identifying the moving object, out of the detected positions of the moving objects, when a plurality of positions of the moving objects is detected.

The remote control device of this aspect can extract the position of the moving object to be controlled using the moving object identification information even when the plurality of provisional positions of the moving objects is detected by the object detection.

In the remote control device of the above aspect, the distance measuring device may be configured to communicate with the at least one processor, and the distance measuring device may be configured to transmit the three-dimensional point cloud data to the remote control device.

In the remote control device of the above aspect, the distance measuring device may be installed on around a traveling road of the moving object.

The remote control device of the above aspect, may further include the distance measuring device.

The present disclosure can also be implemented in various forms other than the remote control device. For example, the present disclosure can be implemented in the form of a remote control system, a method for moving a moving object, a method for manufacturing the moving object, a method for detecting the moving object, a moving object detection device, a method for controlling the remote control system, a method for controlling the remote control device, a computer program that implements these control methods, or a non-transitory recording medium that records the computer program.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

A. First Embodiment

Figure 1:
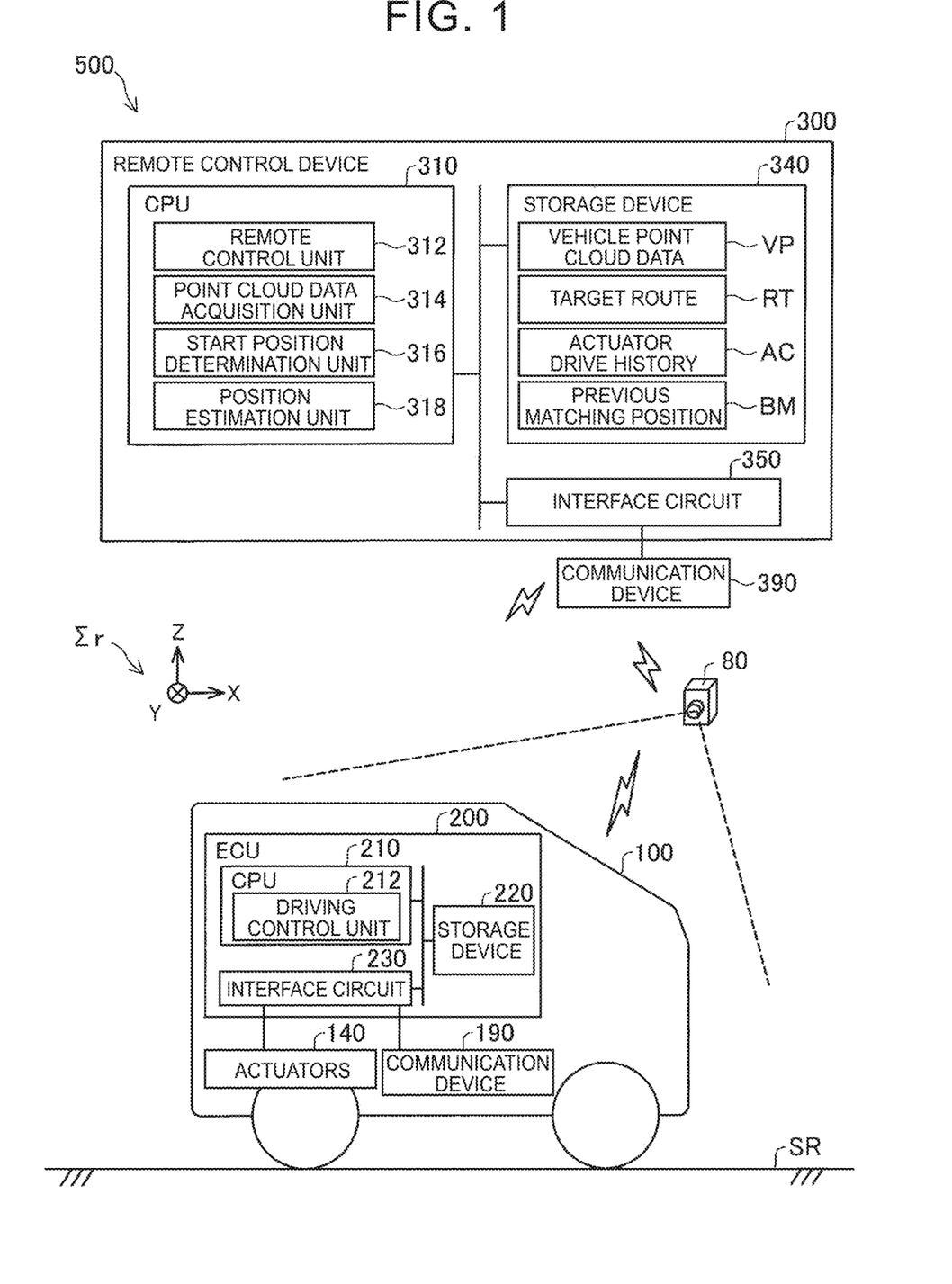
FIG. 1 illustrates a schematic configuration of a remote control system.

FIG. 1 illustrates a schematic configuration of a remote control system 500 including a remote control device 300 according to a first embodiment of the present disclosure. The remote control device 300 generates a control command for autonomous driving of a vehicle 100 by remote control, and transmits it to the vehicle 100. The remote control system 500 is used, for example, in a factory that manufactures the vehicle 100 that can travel by remote control.

Examples of the vehicle 100 include a passenger car, a truck, a bus, and a construction vehicle. The vehicle 100 is preferably a battery electric vehicle (BEV). The vehicle 100 is not limited to the battery electric vehicle, and may be, for example, a gasoline vehicle, a hybrid electric vehicle, or a fuel cell electric vehicle. The vehicle 100 includes a vehicle communication device 190, actuators 140, and an electronic control unit (ECU) 200.

The ECU 200 is mounted on the vehicle 100 and executes various types of control in the vehicle 100. The ECU 200 includes a storage device 220 such as a hard disk drive (HDD), a solid state drive (SSD), an optical recording medium, or a semiconductor memory, a central processing unit (CPU) 210, and an interface circuit 230. The CPU 210, the storage device 220, and the interface circuit 230 are connected via an internal bus so that they can communicate bidirectionally. The actuators 140 and the vehicle communication device 190 are connected to the interface circuit 230. The vehicle communication device 190 performs wireless communication with devices outside the vehicle 100 connected to the network, such as the remote control device 300, via an access point in the factory, etc.

A read/write area of the storage device 220 stores a computer program for implementing at least part of the functions provided in the present embodiment. The functions such as a driving control unit 212 are implemented by the CPU 210 executing various computer programs stored in the memory.

The driving control unit 212 executes driving control on the vehicle 100. The "driving control" refers to various types of control for driving the actuators 140 that execute functions of "running", "turning", and "stopping" of the vehicle 100, as typified by adjustment of an acceleration, a speed, and a steering angle. In the present embodiment, the actuators 140 include an actuator of a drive device for accelerating the vehicle 100, an actuator of a steering device for changing the traveling direction of the vehicle 100, and an actuator of a braking device for decelerating the vehicle 100. The drive device includes a battery, a traveling motor to be driven by battery power, and drive wheels to be rotated by the traveling motor. The actuator of the drive device includes the traveling motor. The actuators 140 may further include an actuator for swinging a wiper of the vehicle 100, an actuator for opening and closing a power window of the vehicle 100, etc.

When a driver is in the vehicle 100, the driving control unit 212 can cause the vehicle 100 to travel by controlling the actuators 140 in response to the driver's operations. The driving control unit 212 can also cause the vehicle 100 to travel by controlling the actuators 140 in response to a control command transmitted from the remote control device 300 regardless of whether a driver is in the vehicle 100.

The remote control system 500 includes one or more vehicle detectors 80 together with the remote control device 300. The vehicle detector 80 is a device for measuring various types of data to be used to estimate at least one of the position of the vehicle 100 and the orientation of the vehicle 100. The vehicle detector 80 is a light detection and ranging (LiDAR) sensor that is a distance measuring device that measures three-dimensional point cloud data of the vehicle 100. The three-dimensional point cloud data indicates the three-dimensional position of a point cloud. With the LiDAR sensor, highly accurate three-dimensional point cloud data can be acquired. The orientation and the traveling direction of the vehicle 100 may be estimated by acquiring only the position of the vehicle 100 using the vehicle detector 80 and acquiring changes in the vehicle 100 over time.

The vehicle detector 80 is connected to the remote control device 300 to communicate with the remote control device 300 by wireless or by wire. By acquiring the three-dimensional point cloud data from the vehicle detector 80, the remote control device 300 can acquire the position and orientation of the vehicle 100 relative to a target route RT in real time. In the present embodiment, the position of the vehicle detector 80 is fixed near a traveling road SR, and the relative relationship between a reference coordinate system Σr and a device coordinate system of the vehicle detector 80 is known. A coordinate transformation matrix for mutually transforming coordinate values of the reference coordinate system Σr and coordinate values of the device coordinate system of the vehicle detector 80 is prestored in the remote control device 300.

The remote control device 300 executes driving control on the vehicle 100 by remote control. The remote control device 300 transports the vehicle 100 during a manufacturing process in the factory by, for example, autonomous driving of the vehicle 100 by remote control. The transportation of the vehicle 100 using autonomous driving by remote control is also referred to as "autonomous driving transportation". The autonomous driving transportation allows the vehicle 100 to move without using a transport device such as a crane or a conveyor. The remote control device 300 may monitor the surroundings of the vehicle 100.

The remote control device 300 includes a central processing unit (CPU) 310, a storage device 340, an interface circuit 350, and a remote communication device 390. The CPU 310, the storage device 340, and the interface circuit 350 are connected via an internal bus so that they can communicate bidirectionally. The remote communication device 390 is connected to the interface circuit 350. The remote communication device 390 communicates with the vehicle 100 via a network etc.

The storage device 340 is, for example, a random access memory (RAM), a read only memory (ROM), an HDD, or an SSD. A read/write area of the storage device 340 stores vehicle point cloud data VP, the target route RT, an actuator drive history AC, and a previous matching position BM. The target route RT is a predetermined traveling route for the vehicle 100 on the traveling road SR.

The vehicle point cloud data VP functions as a template point cloud for estimating at least one of the position and orientation of the vehicle 100. For example, three-dimensional computer-aided design (CAD) data of the vehicle 100 can be used as the vehicle point cloud data VP. The vehicle point cloud data VP may include information for determining the orientation of the vehicle 100. Through template matching using the vehicle point cloud data VP, the position and orientation of the vehicle 100 in the three-dimensional point cloud data can be estimated with high accuracy.

The actuator drive history AC is a history of input and output values for each actuator 140 of the vehicle 100. The actuator drive history AC may be, for example, a history of control command values transmitted from the remote control device 300 to the vehicle 100 or actual measurement values acquired from detectors of the vehicle 100, such as a vehicle speed, a steering angle, a braking force, and a rotation angle.

As described later, the previous matching position BM is a coordinate value of a position where previous template matching between the three-dimensional point cloud data and the vehicle point cloud data VP by a position estimation unit 318 has been completed.

The storage device 340 stores a computer program for implementing at least part of the functions provided in the present embodiment. The CPU 310 executes the computer program stored in the storage device 340 to function as a remote control unit 312, a point cloud data acquisition unit 314, a start position determination unit 316, and the position estimation unit 318. Part or all of these functions may be implemented by hardware circuits. The point cloud data acquisition unit 314 acquires three-dimensional point cloud data measured by the vehicle detector 80.

The start position determination unit 316 determines a start position to start matching the vehicle point cloud data VP with the acquired three-dimensional point cloud data. The start position to start matching is preferably the position of the vehicle 100 to be detected in the three-dimensional point cloud data or a position near the position of the vehicle 100 from the viewpoint of completing template matching quickly.

In the present embodiment, the start position determination unit 316 determines the start position of template matching using information on the position of the vehicle 100 in the three-dimensional point cloud data. The "information on the position of the vehicle 100 in the three-dimensional point cloud data" is data to be used to estimate the position of the vehicle 100 in the three-dimensional point cloud data or a position near the position of the vehicle 100. The "information on the position of the vehicle 100 in the three-dimensional point cloud data" is acquired by a method different from template matching, and is used in a process before template matching is executed. The "information on the position of the vehicle 100 in the three-dimensional point cloud data" is preferably small-size data, data obtained through simple processing, etc. to increase the processing speed of template matching.

The position estimation unit 318 estimates the position and orientation of the vehicle 100 in the acquired three-dimensional point cloud data. In the present embodiment, the position estimation unit 318 estimates the position and orientation of the vehicle 100 in the three-dimensional point cloud data by executing template matching using the vehicle point cloud data VP on the three-dimensional point cloud data. For example, an iterative closest point (ICP) algorithm or a normal distribution transform (NDT) algorithm can be used for template matching of the vehicle point cloud data VP with the three-dimensional point cloud data.

The remote control unit 312 generates a control command for remote control using the estimated position and orientation of the vehicle 100, and transmits it to the vehicle 100. The control command is a command to cause the vehicle 100 to travel along the target route RT stored in the storage device 340. The control command can be generated as a command including a driving force or a braking force and a steering angle. Alternatively, the control command may be generated as a command including at least one of the position and orientation of the vehicle 100 and a future traveling route. When the vehicle 100 receives a remote control request, driving control is implemented by the driving control unit 212 of the ECU 200, and as a result, the vehicle 100 automatically travels.

Figure 2:
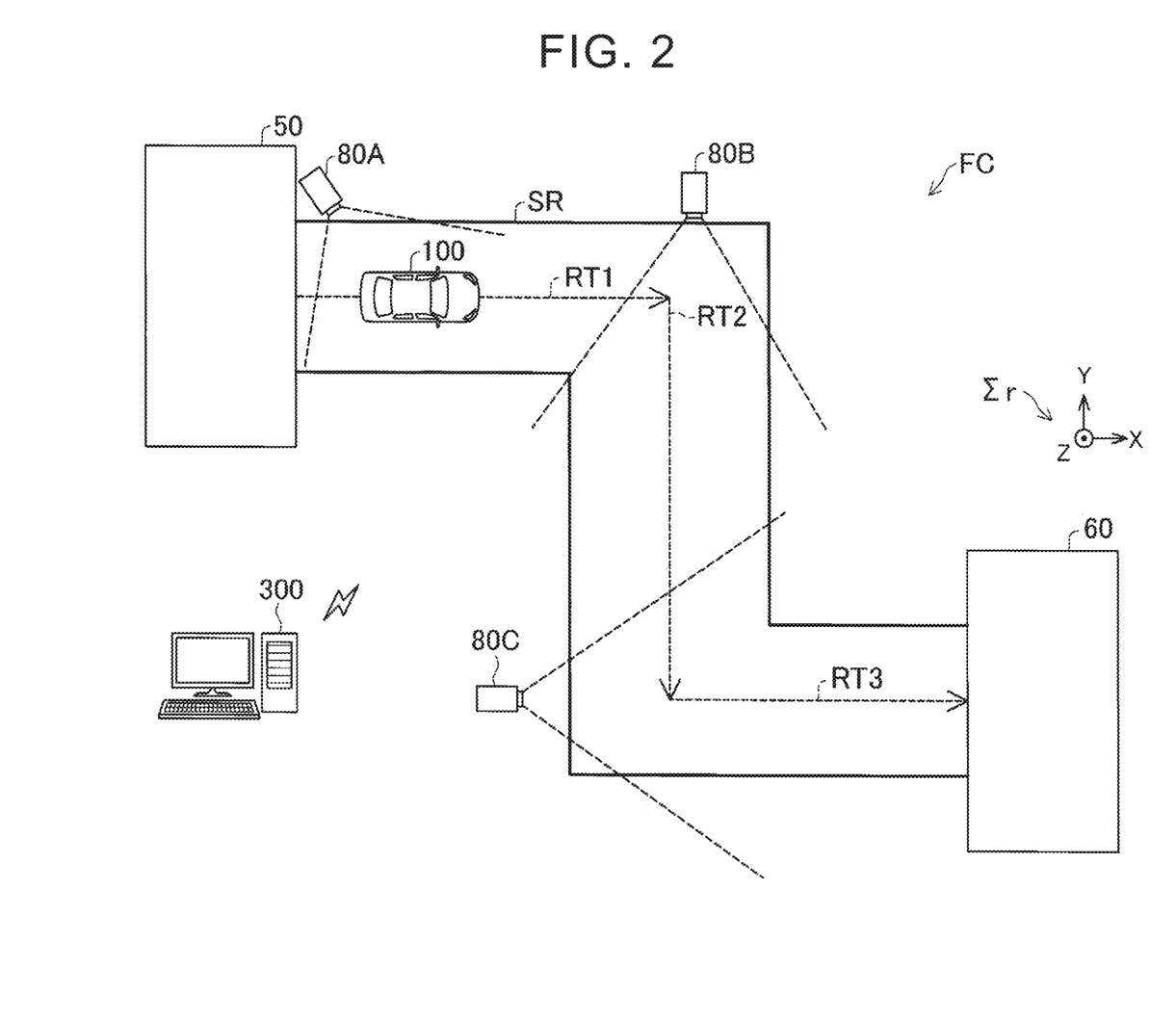
FIG. 2 schematically illustrates a vehicle traveling method.

FIG. 2 schematically illustrates a traveling method for the vehicle 100. FIG. 2 shows how the autonomous driving transportation of the vehicle 100 is executed in a factory FC that manufactures the vehicle 100. The factory FC includes a first process 50 and a second process 60. The first process 50 is, for example, a place where the vehicle 100 is assembled, and the second process 60 is, for example, a place where the vehicle 100 is inspected. The first process 50 and the second process 60 are connected by the traveling road SR where the vehicle 100 can travel. Any position in the factory FC is represented by xyz coordinate values of the reference coordinate system Σr.

The remote control device 300 causes the vehicle 100 to travel along the target route RT while estimating, at predetermined time intervals, the position and orientation of the vehicle 100 in the three-dimensional point cloud data acquired by the vehicle detector 80. In the example of FIG. 2, the target route RT set on the traveling road SR includes mutually continuous target routes RT1, RT2, RT3. A plurality of vehicle detectors 80 including vehicle detectors 80A, 80B, 80C associated with the target routes RT1, RT2, RT3, respectively, is installed around the traveling road SR.

The remote control device 300 switches the vehicle detectors 80 as appropriate based on the position of the vehicle 100, estimates the position and orientation of the vehicle 100, and causes the vehicle 100 to travel along the target route RT. In the example of FIG. 2, the vehicle 100 that has departed from the first process 50 travels along the target route RT1 by remote control using the three-dimensional point cloud data acquired by the vehicle detector 80A. When the vehicle 100 has reached the target route RT2, the vehicle detector 80A is switched to the vehicle detector 80B suitable for detecting the vehicle 100 traveling on the target route RT2. When the vehicle 100 has reached the target route RT3, the vehicle detector 80B is similarly switched to the vehicle detector 80C suitable for detecting the vehicle 100.

Figure 3:
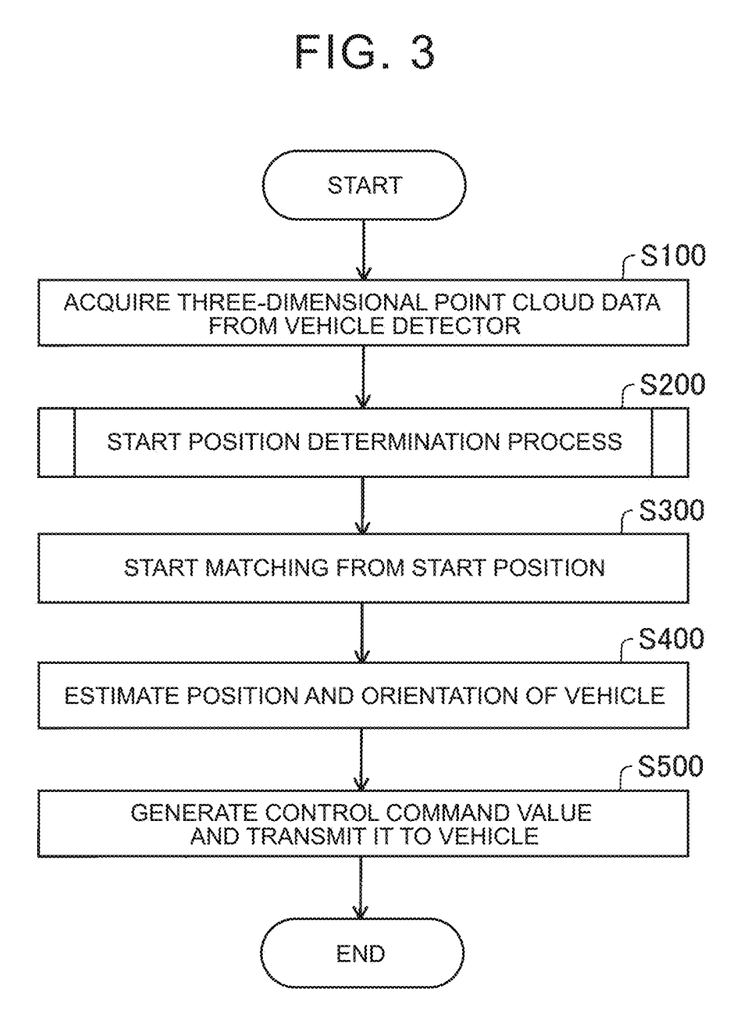
FIG. 3 is a flowchart showing a processing routine of a vehicle traveling process by remote control.

FIG. 3 is a flowchart showing a processing routine of a traveling process for the vehicle 100 by remote control according to the present embodiment. This flow starts when the vehicle 100 starts traveling on the traveling road SR. This flow may be repeated every time the point cloud data acquisition unit 314 newly acquires three-dimensional point cloud data from the vehicle detector 80 that executes measurement for the vehicle 100 to be controlled.

In step S100, the point cloud data acquisition unit 314 acquires three-dimensional point cloud data from the vehicle detector 80. In step S200, the start position determination unit 316 executes a start position determination process. The "start position determination process" is a process for determining a start position to start matching of the vehicle point cloud data VP with the acquired three-dimensional point cloud data.

In step S300, template matching is started from the start position determined by the start position determination process. When matching with the vehicle point cloud data VP cannot be completed at the start position, matching is sequentially executed around the start position. Template matching is repeated while changing the matching position until completion. In step S400, the position estimation unit 318 estimates the position and orientation of the vehicle 100 in the three-dimensional point cloud data by executing template matching using the vehicle point cloud data VP. In step S500, the remote control unit 312 generates a control command for causing the vehicle 100 to travel along the target route RT using the estimated position and orientation of the vehicle 100, and transmits it to the vehicle 100.

Figure 4:
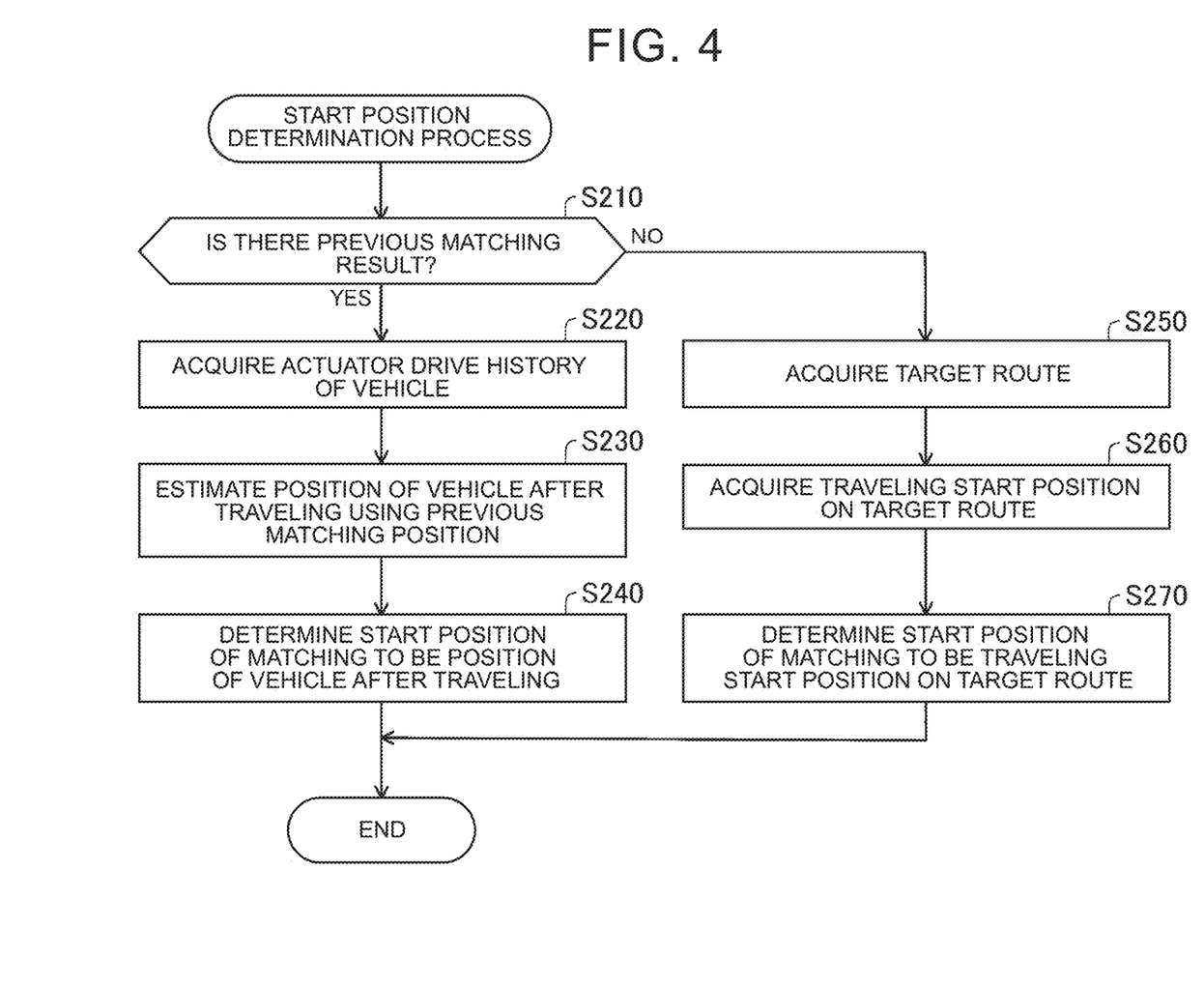
FIG. 4 is a flowchart showing a processing routine of a start position determination process according to a first embodiment.

FIG. 4 is a flowchart showing an example of a processing routine of the start position determination process according to the first embodiment. In the present embodiment, the previous matching position BM where previous matching between the three-dimensional point cloud data and the vehicle point cloud data VP has been completed or the target route RT of the vehicle 100 is selectively used as the "information on the position of the vehicle 100 in the three-dimensional point cloud data" depending on whether a previous matching result is present.

In step S210, the start position determination unit 316 checks whether a matching result of previous template matching is present. Whether a previous matching result is present can be checked based on, for example, whether the previous matching result is stored in a processing history stored in the storage device 340 or whether the previous matching position BM is stored in the storage device 340.

When no previous matching result is present (S210: NO), the start position determination unit 316 advances the process to step S250. In this case, the target route RT of the vehicle 100 is used as the "information on the position of the vehicle 100 in the three-dimensional point cloud data". In step S250, the start position determination unit 316 acquires the target route RT stored in the storage device 340.

In step S260, the traveling start position of the vehicle 100 on the target route RT is acquired. The traveling start position of the vehicle 100 on the target route RT is, for example, prestored in the storage device 340 in association with the target route RT. In the example of FIG. 2, the traveling start position of the vehicle 100 is near the exit of the first process 50.

In step S270, the start position determination unit 316 determines the start position of template matching to be the acquired traveling start position on the target route RT, and terminates this flow. When no previous matching result is present, it is highly likely that the vehicle 100 has not started traveling and is still at the traveling start position. Therefore, when no previous matching result is present, the processing period of template matching can be reduced by setting the traveling start position of the vehicle 100 on the target route RT as the start position.

When a previous matching result is present in step S210 (S210: YES), the start position determination unit 316 advances the process to step S220. In this case, the previous matching position BM where previous matching between the three-dimensional point cloud data and the vehicle point cloud data VP has been completed is used as the "information on the position of the vehicle 100 in the three-dimensional point cloud data". In the present embodiment, the position of the vehicle 100 after traveling at the time of executing current matching is further estimated using the previous matching position BM, and the position after traveling is used as the "information on the position of the vehicle 100 in the three-dimensional point cloud data".

In step S220, the start position determination unit 316 acquires the actuator drive history AC of the vehicle 100. The acquired actuator drive history AC includes at least a drive history of the actuators 140 about the traveling of the vehicle 100 during a period from the time of completion of the previous matching to the time before execution of the current matching. In step S230, the start position determination unit 316 estimates the position of the vehicle 100 after traveling during the period from the time of completion of the previous matching to the time before execution of the current matching. Specifically, the start position determination unit 316 estimates the position of the vehicle 100 after traveling by estimating a traveling route from the previous matching position BM using the drive history of the actuators 140. In step S240, the start position determination unit 316 determines the estimated position of the vehicle 100 after traveling as the start position of template matching, and terminates this flow.

Figure 5:
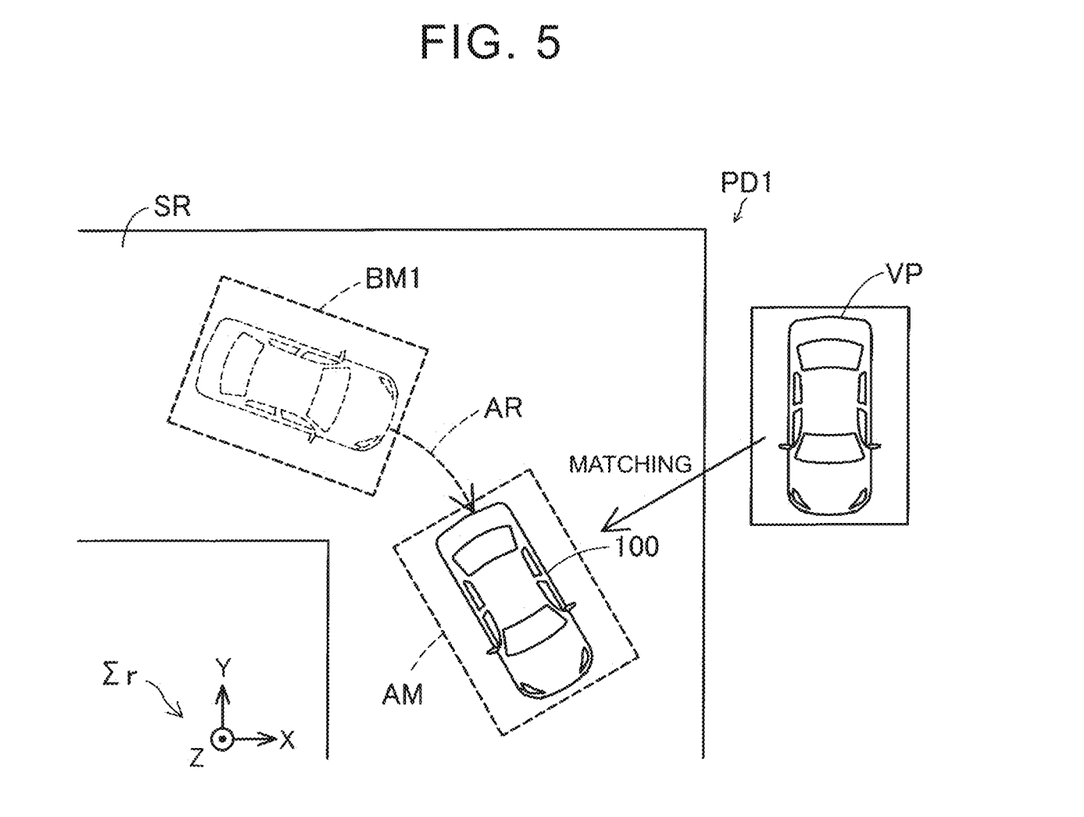
FIG. 5 illustrates an estimated position of a vehicle after traveling from a previous matching position.

FIG. 5 illustrates the estimated position of the vehicle 100 after traveling from the previous matching position. FIG. 5 shows an example of three-dimensional point cloud data PD1 acquired from the vehicle detector 80. The three-dimensional point cloud data PD1 schematically shows a position BMI of the vehicle 100 at the time of previous matching as an example of the previous matching position BM, and a position AM of the vehicle 100 after traveling on a traveling route AR from the previous matching position.

The position AM of the vehicle 100 after traveling can be acquired, for example, by estimating the traveling route AR or the position AM of the vehicle 100 obtained from the actuator drive history AC, starting from the position BMI at the time of previous matching. In another embodiment, the start position determination unit 316 may estimate the traveling route AR or the position AM of the vehicle 100 based on output values from the detectors that acquire a vehicle speed, a steering angle, a braking force, a rotation angle, etc., instead of the actuator drive history AC. Alternatively, the current position of the vehicle 100 acquired from a global navigation satellite system (GNSS) receiver etc. may be used as the position AM of the vehicle 100 after traveling.

The start position determination unit 316 determines the estimated position AM of the vehicle 100 after traveling as the start position of template matching, and the position estimation unit 318 starts template matching using the vehicle point cloud data VP from the position AM. By setting the position AM of the vehicle 100 after traveling as the start position of template matching, the actual position of the vehicle 100 or its vicinity can be set as the start position. Therefore, the processing period required for template matching can be shortened. Compared to a case where template matching is started at a position far from the position AM, it is possible to reduce such trouble that the matching is completed at a position different from the actual position of the vehicle 100 due to a local solution obtained by gradient descent etc. Thus, the accuracy of detection of the vehicle 100 can be improved.

As described above, the remote control device 300 of the present embodiment includes the point cloud data acquisition unit 314 configured to acquire three-dimensional point cloud data measured using the vehicle detector 80, the position estimation unit 318 configured to estimate the position and orientation of the vehicle 100 in the three-dimensional point cloud data by matching the vehicle point cloud data VP with the three-dimensional point cloud data, the start position determination unit 316 configured to determine a start position to start template matching for the three-dimensional point cloud data by the position estimation unit 318, and the remote control unit 312 configured to generate a control command for remotely controlling the vehicle 100 using the estimated position and orientation of the vehicle 100 and transmit the control command to the vehicle 100. The remote control device 300 of the present embodiment can quickly detect the position of the vehicle 100 by setting the start position of matching near the vehicle 100. Therefore, the processing period required for template matching can be shortened.

In the remote control device 300 of the present embodiment, the start position determination unit 316 determines the start position using information on the position of the vehicle 100 in the three-dimensional point cloud data acquired by the point cloud data acquisition unit 314. The position of the vehicle 100 can quickly be detected by setting the start position of template matching to the position of the vehicle 100 using the information on the position of the vehicle 100. Therefore, the processing period required for template matching can be shortened.

In the remote control device 300 of the present embodiment, the start position determination unit 316 acquires the previous matching position BM, and determines the start position of template matching using the acquired previous matching position BM. By using the previous matching position BM that is highly likely to be near the position of the vehicle 100 at the time of current matching, the processing period required for template matching can be shortened through simple processing.

In the remote control device 300 of the present embodiment, the start position determination unit 316 estimates the position AM of the vehicle 100 after traveling from the previous matching position BM during a period from the time of completion of the previous matching to the time before execution of the current matching, and determines the estimated position AM after traveling as the start position of template matching. By estimating the position of the vehicle 100 after traveling, the start position of matching can be set closer to the position of the vehicle 100 at the time of current matching. Therefore, the processing period required for template matching can further be shortened.

In the remote control device 300 of the present embodiment, when no previous matching result is present, the start position determination unit 316 determines the traveling start position on the target route RT as the start position of template matching. By setting the start position on the target route RT where the vehicle 100 is highly likely to be present, the position of the vehicle 100 can be detected quickly. Therefore, the processing period required for template matching can be shortened. In particular, when no previous matching result is present, the traveling start position where the vehicle 100 is highly likely to be present is set as the start position. Therefore, the processing period required for template matching can further be shortened.

B. Second Embodiment

Figure 6:
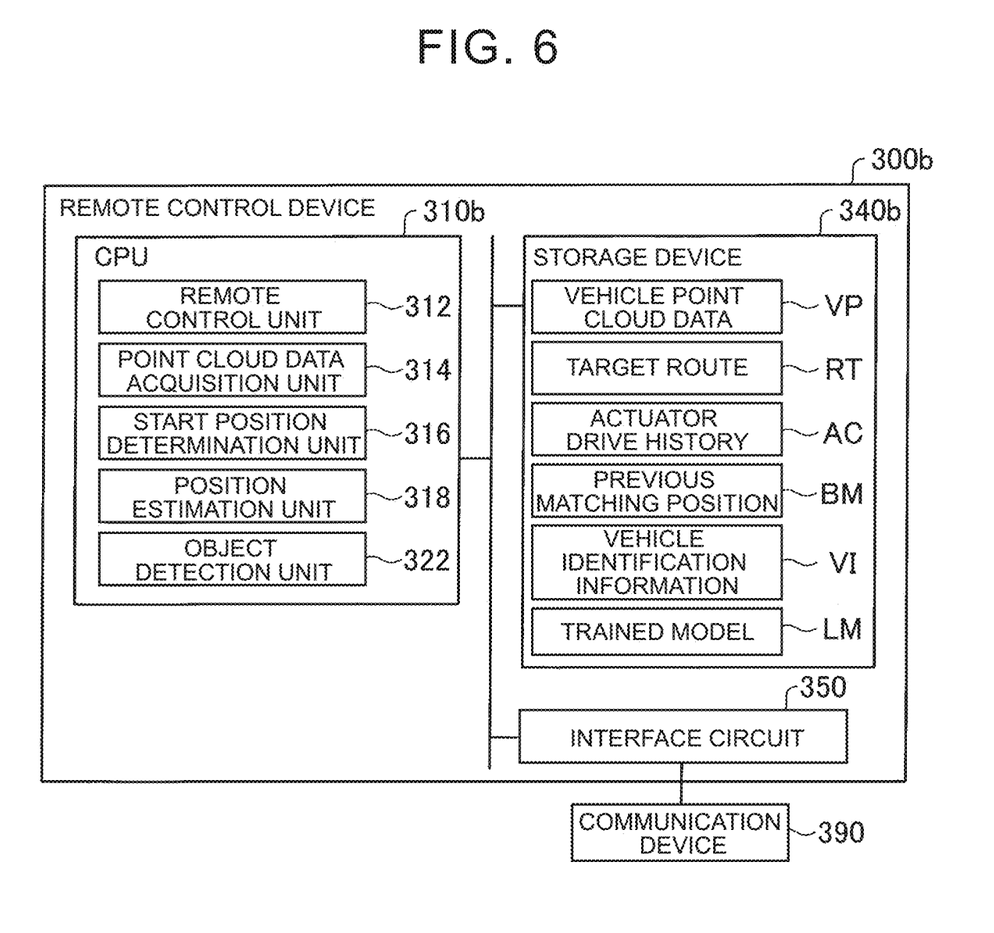
FIG. 6 is a block diagram showing the internal functional configuration of a remote control device according to a second embodiment.

FIG. 6 is a block diagram showing the internal functional configuration of a remote control device 300b according to a second embodiment. The remote control device 300b of the present embodiment differs from the remote control device 300 of the first embodiment in that a CPU 310b that further functions as an object detection unit 322 is provided instead of the CPU 310, and that a storage device 340b that further stores vehicle identification information VI and a trained model LM is provided instead of the storage device 340. The other configuration is the same.

The trained model LM is a machine learning model that executes object detection by a predetermined object detection method using deep learning. The trained model LM has sufficiently been trained using a predetermined data set. For example, various methods using a convolutional neural network (CNN) can be used for the trained model LM. For object detection, it is particularly preferable to employ a method using deep learning such as region-convolutional neural networks (R-CNN), Fast R-CNN, Faster R-CNN, versions of You Only Look Once (YOLO), or single shot detector (SSD).

The object detection unit 322 executes annotation on three-dimensional point cloud data using the trained model LM, and detects the provisional position of the vehicle in the three-dimensional point cloud data. The term "vehicle" in this case means a vehicle as an attribute (class), and may include vehicles other than the vehicle 100 to be controlled. Specifically, the object detection unit 322 executes object detection by inputting the detected three-dimensional point cloud data to the trained model LM, and generates a 3D bounding box for a region recognized as a vehicle. The "bounding box" means a partial region extracted from an external region of three-dimensional point cloud data by enclosing an object region of a vehicle with the smallest rectangular box. That is, the object detection unit 322 extracts the region occupied by the vehicle in the three-dimensional point cloud data by forming the bounding box.

The vehicle identification information VI means various types of information that can identify each vehicle 100. The vehicle identification information VI includes, for example, identification (ID) information assigned to each vehicle 100, such as a vehicle identification number (VIN), specification information of the vehicle 100, such as a vehicle type, a color, a shape, and a size, and production management information of the vehicle 100, such as the name of a process in progress. The vehicle identification information VI may include the size of a bounding box that can be detected. The vehicle identification information VI can be acquired, for example, from a radio frequency-identification (RF-ID) tag attached to the vehicle 100 by short-range wireless communication.

Figure 7:
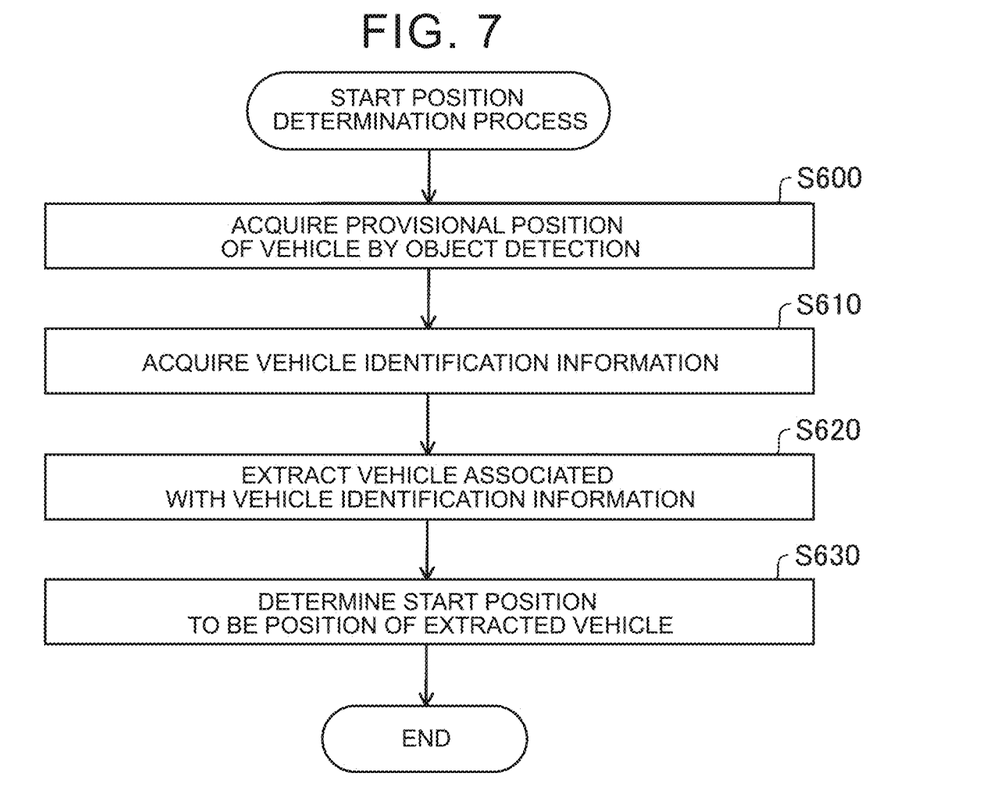
FIG. 7 is a flowchart showing a start position determination process according to the second embodiment.

FIG. 7 is a flowchart showing a start position determination process according to the second embodiment. In step S600, the object detection unit 322 executes object detection using acquired three-dimensional point cloud data, and acquires the provisional position of the vehicle 100 in the three-dimensional point cloud data. More specifically, the object detection unit 322 generates bounding boxes for vehicles in the acquired three-dimensional point cloud data by inputting the three-dimensional point cloud data to the trained model LM.

In step S610, the object detection unit 322 acquires the vehicle identification information VI of the vehicle 100 to be controlled. In step S620, the object detection unit 322 extracts a bounding box associated with the vehicle 100 to be controlled using the vehicle identification information VI. For example, the object detection unit 322 extracts, from the generated bounding boxes, a bounding box that matches the size of the bounding box associated with the vehicle identification information VI of the vehicle 100 to be controlled or the size of the vehicle 100. Instead of the size of the bounding box or the size of the vehicle 100, the vehicle identification information VI may indicate the shape of part or whole of the vehicle 100 or the length, width, and height of part or whole of the vehicle 100. In step S630, the start position determination unit 316 determines the position of the extracted bounding box as the start position of template matching, and terminates this flow.

Figure 8:
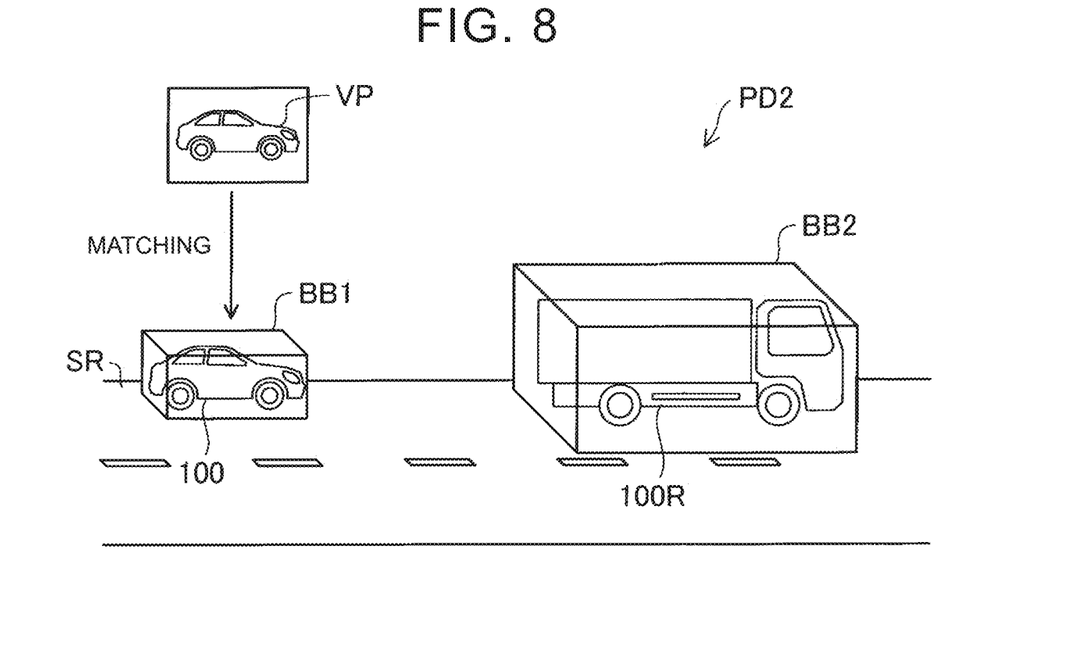
FIG. 8 illustrates template matching in the start position determination process according to the second embodiment.

FIG. 8 illustrates template matching in the start position determination process according to the second embodiment. FIG. 8 shows an example of three-dimensional point cloud data PD2 acquired from the vehicle detector 80. The three-dimensional point cloud data PD2 includes three-dimensional point cloud data of the vehicle 100 to be controlled, and three-dimensional point cloud data of a vehicle 100R that is not to be controlled. The object detection unit 322 generates bounding boxes BB1, BB2 for the vehicle 100 and the vehicle 100R recognized as vehicles by inputting the three-dimensional point cloud data PD2 into the trained model LM.

Next, the object detection unit 322 acquires the vehicle identification information VI. The vehicle identification information VI in this case is preferably information on, for example, the sizes and widths of the vehicles 100, 100R or the sizes of the bounding boxes as information convenient for distinguishing the vehicles 100, 100R having different sizes. Based on the acquired vehicle identification information VI, the bounding box BB1 of the vehicle 100 is extracted out of the bounding boxes BB1, BB2. The start position determination unit 316 determines the position of the extracted bounding box BB1 as the start position of template matching, and the position estimation unit 318 starts template matching using the vehicle point cloud data VP from the position of the bounding box BB1 as the start position.

As described above, in the remote control device 300b of the present embodiment, the start position determination unit 316 determines, as the start position, the position of the vehicle 100 detected from the three-dimensional point cloud data PD2 by the predetermined object detection method using deep learning. The position of the vehicle 100 can be extracted from the three-dimensional point cloud data PD2 using the known method that is the object detection using deep learning. The start position can be set near the vehicle 100 using the position of the vehicle 100 in the three-dimensional point cloud data PD2. Therefore, the processing period required for template matching can be shortened.

In the remote control device 300b of the present embodiment, when the positions of the plurality of vehicles 100, 100R are detected, the start position determination unit 316 further uses the vehicle identification information VI for identifying the vehicle 100 to determine the start position using the position of the vehicle 100 associated with the vehicle identification information VI out of the detected positions of the plurality of vehicles 100. Therefore, the position of the vehicle 100 to be controlled can be extracted even when the plurality of vehicles 100, 100R is detected by the object detection method using deep learning.

C. Third Embodiment

Figure 9:
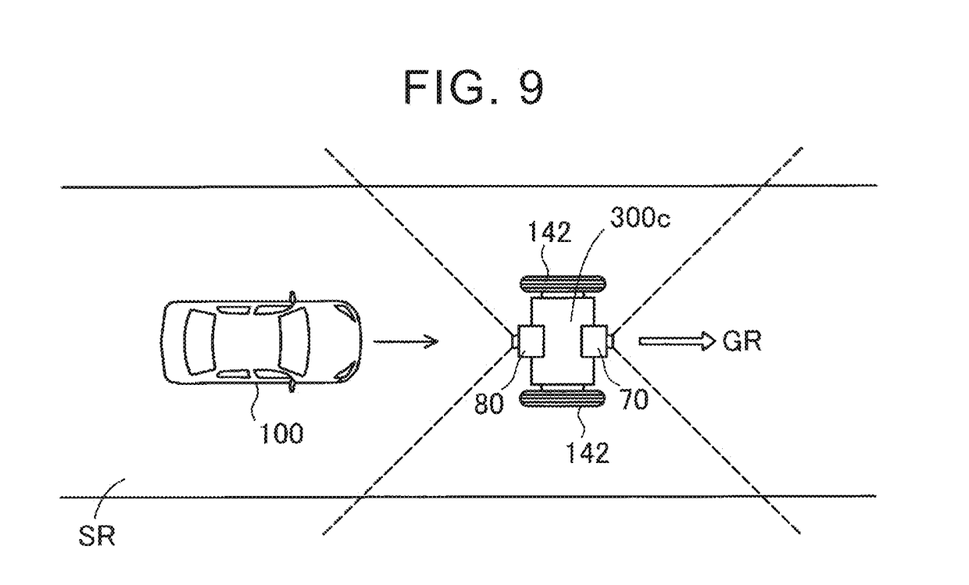
FIG. 9 is a top view illustrating an example of the overall configuration of a remote control device according to a third embodiment.

FIG. 9 is a top view illustrating an example of the overall configuration of a remote control device 300c according to a third embodiment. The remote control device 300c of the present embodiment is an automated guided vehicle also called "guide mobility". The remote control device 300c has a function of autonomously driving the vehicle 100 by remote control as in the first embodiment, and also has a function of autonomously driving the body of the remote control device 300c on the traveling road SR. That is, the remote control device 300c autonomously drives the succeeding vehicle 100 by remote control to guide it while being autonomously driven on the traveling road SR.

The remote control device 300c includes drive wheels 142 for autonomous driving, an autonomous driving detector 70, and a vehicle detector 80. The function of the vehicle detector 80 is the same as that of the vehicle detector 80 shown in the first embodiment, and therefore description thereof will be omitted. The autonomous driving detector 70 is a distance measuring device such as a camera or a LiDAR sensor. Data acquired by the autonomous driving detector 70 is used for simultaneous localization and mapping (SLAM) for autonomous driving of the remote control device 300c. The camera may be a stereo camera, a monocular camera, an RGB-D camera (depth camera), etc. A time-of-flight (ToF) sensor etc. may be used instead of the camera or the LiDAR sensor. In the example of FIG. 9, the vehicle detector 80 is only mounted on the remote control device 300c. The vehicle detector 80 may also be installed around the traveling road SR.

Figure 10:
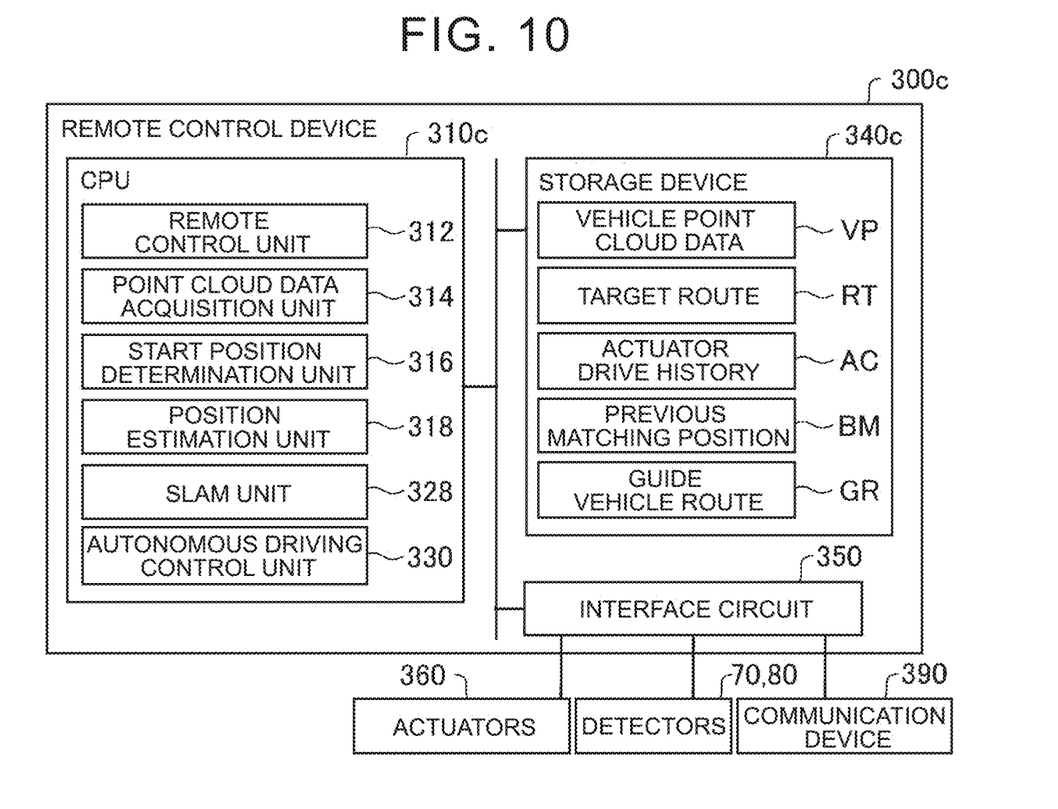
FIG. 10 is a block diagram showing the internal functional configuration of the remote control device according to the third embodiment.

FIG. 10 is a block diagram showing the internal functional configuration of the remote control device 300c according to the third embodiment. The internal functional configuration of the remote control device 300c differs from that of the remote control device 300 of the first embodiment in that a CPU 310c that further functions as a SLAM unit 328 and an autonomous driving control unit 330 is provided instead of the CPU 310, and that a storage device 340c that further stores a guide vehicle route GR is provided instead of the storage device 340. The other configuration is the same. The guide vehicle route GR is a predetermined target route where the remote control device 300c is expected to travel.

Actuators 360 include actuators of a drive device, a steering device, and a braking device for autonomous driving of the remote control device 300c. The drive device includes a battery, a traveling motor to be driven by battery power, and the drive wheels 142 to be rotated by the traveling motor.

The SLAM unit 328 executes SLAM using data detected by the autonomous driving detector 70, and generates a map for autonomous driving of the remote control device 300c. The autonomous driving control unit 330 controls the actuators 360 to autonomously drive the remote control device 300c. Specifically, the autonomous driving control unit 330 autonomously drives the remote control device 300c along the guide vehicle route GR stored in the storage device 340c using the map generated by the SLAM unit 328.

As shown in FIG. 9, when the remote control device 300c travels along the guide vehicle route GR, the vehicle 100 is guided by the remote control of the remote control device 300c and travels on the same traveling route as that of the remote control device 300c. In the present embodiment as well as the first embodiment, template matching is executed on the three-dimensional point cloud data acquired from the vehicle detector 80, and the start position determination unit 316 executes the start position determination process for determining the start position of template matching. In the present embodiment as well as the first embodiment, the remote control device 300c that is autonomously driven also sets the start position of template matching near the vehicle 100 using the information on the position of the vehicle 100. Therefore, the processing period required for template matching can be shortened.

D. Other Embodiments (D1) The second embodiment illustrates the example in which the bounding box of the vehicle is generated by the object detection method using deep learning and the position of the vehicle 100 extracted using the generated bounding box is determined as the start position. Instead of generating the bounding box, the object detection unit 322 may execute preprocessing to remove background point cloud data representing stationary objects from the acquired three-dimensional point cloud data. This preprocessing is also called "background subtraction". In this case, the start position determination unit 316 determines, as the start position of template matching, the provisional position of the vehicle 100 detected based on a difference between the point cloud data associated with the background of the three-dimensional point cloud data and the point cloud data associated with the vehicle 100 to be detected. The remote control device 300 configured in this way can determine the start position through the simple processing that is the background subtraction.

(D2) The first embodiment illustrates the example in which the start position determination unit 316 sets the traveling start position of the vehicle 100 on the target route RT as the start position when no previous matching result is present. The start position determination unit 316 may set the traveling start position of the vehicle 100 on the target route RT as the start position regardless of whether the previous matching result is present. Instead of the traveling start position on the target route RT, any position on the target route RT may be determined as the start position. In this case, step S260 shown in FIG. 4 can be omitted. With the remote control device 300 configured in this way, the processing period required for template matching can be shortened by setting the start position on the target route RT where the vehicle 100 is highly likely to be present. When the vehicle 100 cannot be detected at the start position in this case, template matching is preferably executed along the target route RT.

The start position determination unit 316 may acquire the previous matching position BM on the target route RT last time, and determine the start position using the acquired previous matching position BM on the target route RT. With the remote control device 300 configured in this way, the processing period required for template matching can be shortened by the simple method using the previous matching position BM on the target route RT where the vehicle 100 is more highly likely to be present.

(D3) Each of the above embodiments illustrates the example in which the vehicle 100 is a passenger car, a truck, a bus, a construction vehicle, etc. However, the vehicle 100 is not limited to these, and may include various automobiles such as two-wheeled vehicles and four-wheeled vehicles, trains, etc. Various moving objects other than the vehicle 100 may be used. The "moving object" means an object that can move. Examples of the moving object include an electric vertical take-off and landing aircraft (so-called flying car), a ship, an aircraft, a robot, and a magnetically levitated train. In this case, the terms "vehicle" and "car" in the present disclosure can be replaced with "moving object" as appropriate, and the term "travel" can be replaced with "move" as appropriate.

(D4) The vehicle 100 only needs to have a configuration in which the vehicle 100 can move by remote control. For example, the vehicle 100 may be in the form of a platform having a configuration described below. Specifically, the vehicle 100 only needs to have a configuration to execute the functions of "running", "turning", and "stopping" by remote control. That is, the "vehicle 100 that can move by remote control" need not have at least part of the interior components such as a driver's seat and a dashboard, at least part of the exterior components such as a bumper and a fender, or a body shell. In this case, the remaining components such as the body shell may be mounted on the vehicle 100 before the vehicle 100 is shipped from the factory, or may be mounted on the vehicle 100 after the vehicle 100 is shipped from the factory with the remaining components such as the body shell unmounted on the vehicle 100.

(D5) The first embodiment illustrates the example in which the start position determination unit 316 further estimates the position AM of the vehicle 100 after traveling from the previous matching position BM. The start position may be a position other than the position AM after traveling. For example, the previous matching position BM may be used. By using the previous matching position BM that is highly likely to be near the position of the vehicle 100, the processing period required for template matching can be shortened through simple processing.

(D6) The first embodiment illustrates the example in which the start position determination unit 316 determines the start position using the previous matching position BM, and the example in which the start position determination unit 316 determines any position on the target route RT as the start position. The start position determination unit 316 may determine a position other than the previous matching position BM or a position different from the target route RT as the start position. For example, the start position determination unit 316 may determine, as the start position, the provisional position of the vehicle 100 acquired based on a detection result from a detector different from the vehicle detector 80.

(D7) The third embodiment illustrates the example in which the object detection unit 322 extracts the vehicle 100 to be controlled using the vehicle identification information VI. For example, when a single bounding box is generated in step S600, that is, when a bounding box of only the vehicle 100 to be controlled is generated, the vehicle identification information VI need not be used. Also, when the vehicle 100 to be controlled can be extracted using information other than the vehicle identification information VI, such as the position of the vehicle 100, the object detection unit 322 need not acquire the vehicle identification information VI. In this case, steps S610, S620 shown in FIG. 7 may be omitted.

The controls and their methods described in the present disclosure may be implemented by a dedicated computer provided by configuring a memory and a processor programmed to execute one or more functions implemented by a computer program. Alternatively, the controls and their methods described in the present disclosure may be implemented by a dedicated computer provided by configuring a processor with one or more dedicated hardware logic circuits. Alternatively, the controls and their methods described in the present disclosure may be implemented by one or more dedicated computers configured by a combination of a memory and a processor programmed to execute one or more functions and a processor configured by one or more hardware logic circuits. The computer program may be stored in a computer-readable non-transitory tangible storage medium as instructions to be executed by a computer.

The present disclosure is not limited to the above embodiments, and can be implemented by various configurations without departing from the spirit of the present disclosure. For example, the technical features in each embodiment corresponding to the technical features in each aspect described in "SUMMARY" can be replaced or combined as appropriate in order to solve some or all of the above issues or achieve some or all of the above effects. When the technical features are not described as essential in the present specification, such technical features can be omitted as appropriate.

What is claimed is:

1. A remote control device comprising:
    at least one memory configured to store computer program code;
    at least one processor configured to operate as instructed by the computer program code, the computer program code including:
        point cloud data acquisition code configured to cause the at least one processor to acquire three-dimensional point cloud data measured using a distance measuring device;
        position estimation code configured to cause the at least one processor to estimate at least one of a position and an orientation of a moving object in the three-dimensional point cloud data by matching a template point cloud indicating the moving object with the three-dimensional point cloud data;
        start position determination code configured to cause the at least one processor to determine a start position in the three-dimensional point cloud data to start matching of the template point cloud with the three-dimensional point cloud data by the position estimation code; and
        remote control code configured to cause the at least one processor to generate a control command for remotely controlling the moving object using at least one of the estimated position and the estimated orientation of the moving object and transmits the control command to the moving object, wherein
    the start position determination code is further configured to determine the start position using information on a drive history of an actuator provided in the moving object, out of information on a position used for the matching and information included in the control command, and using information on at least one of the position and the orientation of the moving object used to generate the control command, and of a target route predetermined as a traveling route of the moving object by the remotely controlling, determine the start position using information on the position of the moving object in the three-dimensional point cloud data, acquire, as the information on the position of the moving object, a previous matching position where previous matching between the three-dimensional point cloud data and the template point cloud has been completed, and determine the start position using the acquired previous matching position.

2. The remote control device according to claim 1, wherein
    the start position determination code is further configured to:
        estimate a position of the moving object after movement from the previous matching position during a period from a time of completion of the previous matching to a time before execution of current matching, and
        determine the start position using the estimated position after the movement.

3. The remote control device according to claim 1, wherein the memory stores the target route that is the information on the position of the moving object, and wherein
    the start position determination code is further configured to determine any position on the target route as the start position.

4. The remote control device according to claim 3, wherein
    the start position determination code is further configured to:
        acquire a previous matching position where previous matching between the three-dimensional point cloud data and the template point cloud has been completed on the target route, and
        determine the start position using the acquired previous matching position on the target route.

5. The remote control device according to claim 1, wherein
    the start position determination code is further configured to determine the start position using, as the information on the position of the moving object, any of a position of the moving object detected from the three-dimensional point cloud data by a predetermined object detection method, and a position of the moving object detected based on a difference between point cloud data associated with a background of the three-dimensional point cloud data and point cloud data associated with the moving object.

6. The remote control device according to claim 5, wherein the start position determination code is further configured to:

when a plurality of positions of the moving objects is detected, determine the start position using the position of the moving object associated with a moving object identification information, for identifying the moving object, out of the plurality of detected positions of the moving objects.

* * * * *